April 12, 1960 G. KOCH ET AL 2,932,227
MACHINES FOR MACHINING HOLLOW BODIES
Filed April 25, 1955
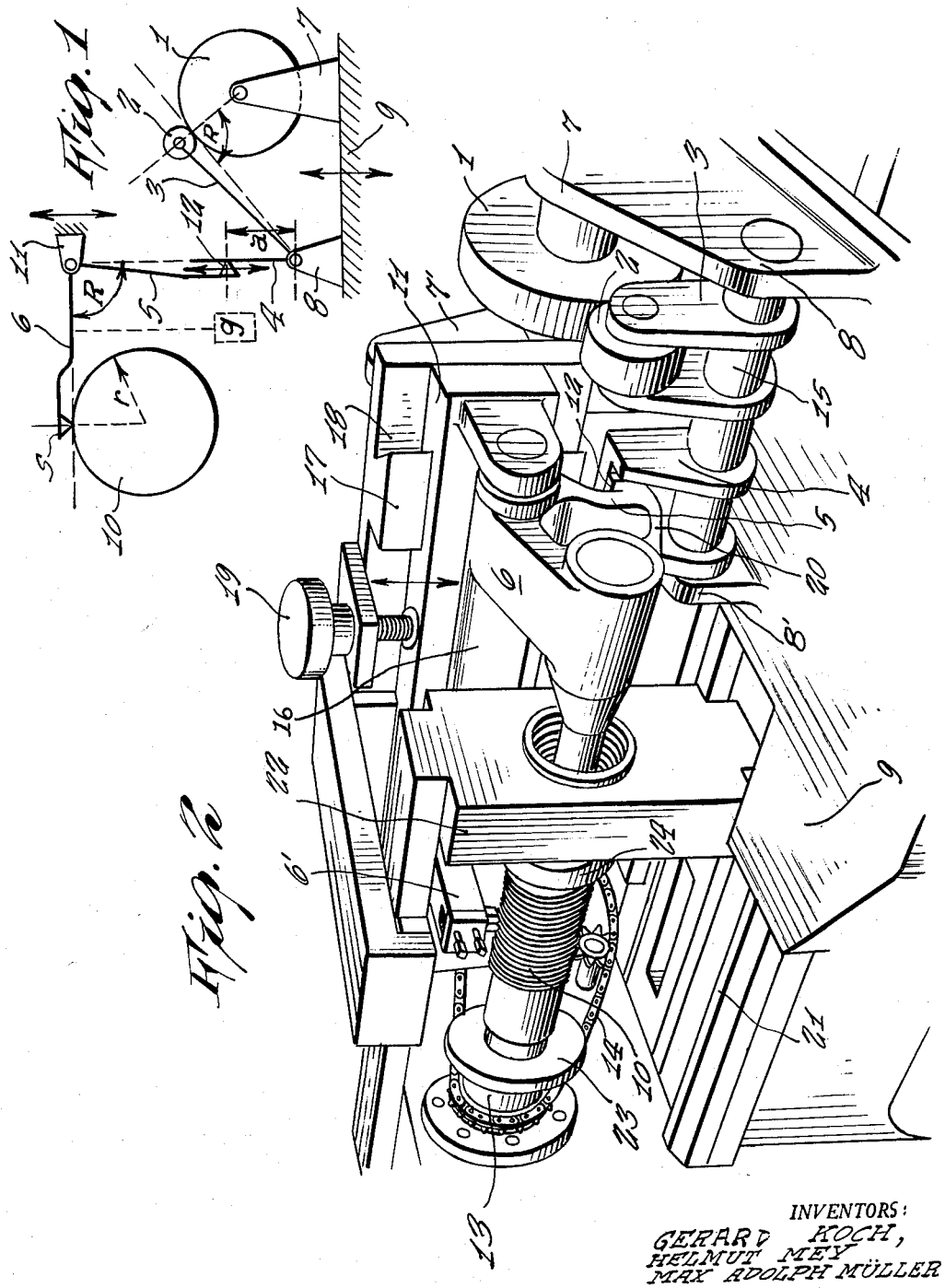
INVENTORS:
GERARD KOCH,
HELMUT MEY
MAX ADOLPH MÜLLER
BY
Armand E. Mestern
ATTORNEY United States Patent Office 2,932,227
Patented Apr. 12, 1960

2,932,227

MACHINES FOR MACHINING HOLLOW BODIES

Gerard Koch, Burscheid, near Koln, Germany, Helmut Mey, Stockport, England, and Max Adolf Müller, Koln, Germany, assignors to Goetzewerke Friedrich Goetze Aktiengesellschaft, Burscheid, near Koln, Germany Application April 25, 1955, Serial No. 503,556

Claims priority, application Germany April 24, 1954

2 Claims. (Cl. 82—19)

This invention relates to machines for machining hollow bodies, particularly for machining piston rings made up into bundles. More particularly the invention relates to those machines which enable piston rings to be separated from a hollow body or combined to form a bundle to be given, as desired, an exact circular ring form or any other non-circular form different from said circular ring form. This non-circular form serves to impart to the rings, after their insertion into a cylinder of exactly circular cross-section, a clearly determined radial pressure irregularly distributed over their periphery, by which they bear against the walls of the cylinder.

It has already been attempted to construct devices which, with the aid of a single pattern, enable rings of different sizes to be produced, which are geometrically similar to one another. Machines of this type must have various adjustment facilities.

The present invention aims at providing an apparatus for the cutting machining of hollow bodies or bundles of rings, in which through the variation of the distance between the tool cutting edge and the spindle axis, without any special adjusting work, rings are always obtained which are geometrically similar to one another, that is to say always have the same non-circular ratio which has been adjusted once and for all.

To this end, according to the invention, two lever systems are used to transmit the movement of the sensing lever bearing on the pattern to the tool, one of which lever systems consists of the sensing lever and a control lever rigidly joined thereto, while the other consists of the rockably mounted tool holder and a transmission lever rigidly joined thereto. The transmission of the oscillatory movements of the control lever to the transmission lever is effected by the fact that the transmission lever bears by means of a point or knife-edge fastened to it against the control lever and is continuously held in contact therewith. If the arrangement is such that the rocking axis of the tool carrier is an exact extension of the control lever and can be displaced in said extension for the purpose of adaptation to different workpiece diameters, while the cutting edge of the tool is in contact with the workpiece at the angle of intersection of an axial plane parallel to the control lever and the tangential plane laid through the rocking axis of the tool carrier to the workpiece, the effective length of the control lever is in each case varied by the same amount as the distance between the cutting edge of the tool and the workpiece axis is varied. In order to obtain exact geometrical coincidence between each variation of the distance between the tool and the workpiece axis, on the one hand, and the consequent variation of the effective length of the control lever, on the other hand, it is then merely necessary to ensure that the effective length ($a$) of the control lever is always equal to the distance ($r$) between the cutting edge of the tool and the workpiece axis, i.e. is equal to the radius of the workpiece.

If instead of varying the diameter, it is desired to vary the non-circularity of the rings to be produced, that is to say the ratio between their smallest diameter and their largest diameter, without having to replace the pattern by another, this can also be achieved in simple manner with the apparatus described, by securing the point or knife-edge, by which the transmission lever makes contact with the control lever, to be longitudinally displaceable on the control lever. An adjustment of the point or knife-edge then effects a variation of the effective length of the transmission lever in relation to the effective length of the control lever, and hence a variation of the resulting non-circular form in relation to the sensed non-circular form of the pattern. In order to maintain the afore-mentioned condition $a=r$, the pattern and the common bearing for the sensing and control levers must in this case naturally be displaced by the same amount and in the same direction as the point or knife-edge on the transmission lever. In this case also, by displacement of the tool holder axis, rings which are geometrically similar to one another can always be obtained.

In order not to endanger the great accuracy of sensing obtainable with the hereindescribed apparatus, it is advisable to dispose on a common slide those structural parts which are to act in strict dependence on one another, namely the rockably mounted tool holder which is adjustable with its rocking bearing in relation to the workpiece axis, and the pattern with the necessary sensing and transmission means. In this way sliding movements of any of these sensitive structural parts in relation of one another, and hence also the inaccuracies and wear phenomena unavoidable if such sliding movements occur, are avoided.

Since in operation both the control lever and the transmission lever perform oscillating movements, the foregoing instructions are in each case to be taken as referring to the middle position between their end deflections. In the case of the simultaneous use of one external and one internal tool, the ring diameter is to be taken as the means diameter of the ring.

The invention is illustrated in greater detail in the accompanying drawings, in which:

Figure 1 shows a diagram of the principles underlying the same; and

Figure 2 is an elevation of one embodiment of the apparatus in accordance with the invention.

As can be seen from Figure 1, the non-circular disc 1 serving as pattern is mounted in the bearing pedestal 7 which is secured on the slide 9. On the same slide 9 is mounted another bearing 8 which carries the sensing lever 3 with a follower 2 and the control lever 4. The control lever 4 is rigidly connected to the sensing lever. The transmission lever 5 which is rockable in the bearing 11 and rigidly connected to the tool holder 6 bears by a knife-edge 12 against the lever 4. At the free end of the tool carrier 6 is fastened the tool $s$ which bears against the workpiece 10. The knife-edge of the tool $s$ lies not only in an axial plane of the workpiece parallel to the control lever 4, but also in the tangential plane laid against the workpiece through the bearing 11. The bearing 11 lies in an extension of the control lever 4 assuming the same to be in normal position and is mounted likewise on the slide 9 to be adjustable in the direction of the arrow in this extension. Said slide 9 is adapted to travel parallel to the axis of the workpiece 10, in order that during the machining of this workpiece 10 the tool $s$ can be moved forward over the latter. Through the displacement of the bearing 11 the tool $s$ can be adjusted to different workpiece diameters. At the same time, on a displacement of this type there is a variation of the distance between the knife-edge 12 mounted on the transmission lever 5 and the rocking bearing of said control lever 4 in the bearing pedestal 8. A variation of this distance however at the same time effect a variation of the effective length of the control lever 4 and hence a variation of the transmission ratio between the oscillations of the sensing lever 3 and those of the tool holder 6. Owing to the fact that, as in the example illustrated, the knife-edge 12 is so disposed that the effective length $a$ of the control lever 4 is equal to the radius $r$ of the workpiece 10, the effect is achieved that the transmission ratio between the oscillations of the lever 3 and those of the tool holder 6 always varies in the same geometrical ratio as the workpiece radii $r$. The knife-edge 12 is adaptable in the direction of the arrow on the transmission lever 5, while similarly the bearing pedestals 7 and 8 can be moved with the slide 9 in the direction of the arrow. In this way it is possible to restore the condition $a=r$ in the event of the displacement of the knife-edge 12 on the transmission lever 5. In consequence, even after such a displacement of the knife-edge 12 and bearing pedestals 8 and 7, cross-sectional shapes of the workpiece 10 which are still geometrically identical with one another are obtained by displacement of the bearing 11. The lever system 5, 6 is held in constant engagement with the lever system 3, 4 by the weight $g$.

In the embodiment illustrated in Figure 2 for a machine constructed according to the principles hereinbefore set forth, the non-circular disc 1 serving as pattern is rotatably mounted between the bearing pedestals 7, 7'. It is driven by the turning spindle 13 by means of a chain 14. The roller 2 sensing the pattern is mounted at the free end of the lever 3, which is rigidly fastened together with the control lever 4 on a shaft 15. The shaft 15 is mounted rockably in the bearing pedestals 8, 8' which are held rigid on the slide 9 together with the bearing pedestals 7, 7'. The control lever 4 bears against the transmission lever 5 with its free end, said lever carrying for this purpose a point or knife-edge facing the control lever 4. Through said transmission lever 5 the control lever 4 transmits its oscillatory movements to the tool holders 6, 6', which are together mounted rigidly on the shaft 16, although their angular positions in relation to one another are variable. Said shaft 16 is rockably mounted in a bearing carrier 11 constructed as a slide displaceable in the direction of the arrow. The bearing carrier 11 is held on the guide plate 18 in a dovetail guide 17. The adjusting screw serves to adjust the height of the bearing carrier 11 on the guide plate 18 and hence on the slide 11. Between the transmission lever 5 and the tool carrier 6 a reinforcement 20 is preferably provided, which provides a non-rotatable and vibration-free connection of the lever 5 to the tool carrier 6. The slide 9 is slidable on the lathe bed 21 parallel to the axis of the lathe spindle 13. The bundle of piston rings 10 forming the workpiece is clamped without support between the annular abutment 24 mounted on the block 22 to be rotatable about the spindle axis and the faceplate 23 joined fast to the spindle 13.

The arrangement illustrated operates in the following manner:

After a number of piston rings combined to form a bundle 10 has been clamped fast between the abutment 22 and the faceplate 23 centrally in relation to the spindle axis, the tool holders 6 and 6', which are adjusted to ring width in relation to one another, together with the slide 9 are brought up to the bundle 10. The rocking movements producing the non-circular shape of the rings to be turned are communicated to the tool holders 6, 6' through the levers 5, 4, and 3 and the sensing roller 2 from the pattern 1. Through the further movement of the slide 9, the reciprocating tools are advanced over the entire length of the bundle of rings 10, thereby imparting to the latter the desired non-circular shape. If it is desired to change the device over to another ring size of geometrically similar form, the slide 11 need merely be moved the necessary amount in the direction of the arrow by turning the screw 19. As the distance between the tool cutting edges and the spindle axis varies, the length ratio between the effective part of the control lever 4 and the transmission lever 5 the effective length of which remains constant is also varied thereby.

We claim:

1. A copying lathe comprising means for rotating a workpiece on an axis, a cam shaft spaced from said axis, a cam on said shaft, two two arm levers located in the space bounded by parallel planes through said axis and said shaft, the first of said two arm levers having one arm at right angle to said plane through said axis with a toolholder on said arm adapted to place the cutting point of a tool at the intersection of said plane through said axis and the periphery of the work, the other arm of said lever having a contact point and said other arm and point being so positioned that a line joining said contact point and the juncture of said levers is at right angles to said first arm, means slidable in a path parallel to said plane and a pivot at the juncture of the two arms of said first lever mounted on said means, the other two arm lever having one arm in the plane of said contact and first pivot provided with a lengthwise surface for engagement with said contact point and the other arm extending at an angle thereto and provided with a follower engaging said cam.

2. A copying lathe as in claim 1 wherein said follower is located on the same side of a plane connecting said axis and said shaft as said toolholder.

References Cited in the file of this patent

UNITED STATES PATENTS

| 1,703,559 | Teetor | Feb. 26, 1929 |
| 1,739,268 | Stein | Dec. 10, 1929 |
| 2,704,480 | Junker | Mar. 22, 1955 |
| 2,782,669 | Brandenberger | Feb. 26, 1957 |

FOREIGN PATENTS

| 710,887 | Great Britain | June 23, 1954 |